(12) United States Patent
Matsumoto et al.

(10) Patent No.: US 8,625,893 B2
(45) Date of Patent: Jan. 7, 2014

(54) IMAGE PROCESSING DEVICE AND IMAGE PROCESSING METHOD

(75) Inventors: Jun Matsumoto, Kanagawa (JP);
Nobuyuki Matsushita, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 13/429,968

(22) Filed: Mar. 26, 2012

(65) Prior Publication Data

US 2012/0250995 A1    Oct. 4, 2012

(30) Foreign Application Priority Data

Apr. 1, 2011    (JP) .................................. 2011-081543

(51) Int. Cl.
*G06K 9/00*    (2006.01)

(52) U.S. Cl.
USPC ........................................................ 382/167

(58) Field of Classification Search
USPC ....................................................... 382/167
See application file for complete search history.

(56) References Cited

U.S. PATENT DOCUMENTS

| | | | | |
|---|---|---|---|---|
| 5,761,341 | A * | 6/1998 | Go | 382/232 |
| 7,668,406 | B2 * | 2/2010 | Schnee et al. | 382/313 |
| 8,244,034 | B2 * | 8/2012 | Ishiga | 382/167 |
| 2011/0150354 | A1 * | 6/2011 | Huang | 382/260 |

FOREIGN PATENT DOCUMENTS

| | | |
|---|---|---|
| JP | 2006-14024 | 1/2006 |
| JP | 2010-157163 | 7/2010 |

OTHER PUBLICATIONS (Sei Mashashi, Machine translation of JP2006333316, Dec. 2006).*

* cited by examiner

*Primary Examiner* — Samir Ahmed
*Assistant Examiner* — Totam Le
(74) *Attorney, Agent, or Firm* — Sony Corporation

(57) ABSTRACT

The present technology relates to an image processing device including: a reducing section configured to generate a plurality of reduced images by reducing an input image at a plurality of reduction ratios; a noise removal processing section configured to generate noise-removed images by performing noise removal processing on each of the reduced images; an enlarging section configured to generate enlarged images equal to each other in size by enlarging each of the noise-removed images; and a mixing section configured to generate an output image by mixing two or more different enlarged images of the enlarged images with each other.

11 Claims, 11 Drawing Sheets

FIG.4

| Cr | Y1 | Cr | Y1 | Cr | Y1 | Cr | Y1 | Cr | Y1 |
|----|----|----|----|----|----|----|----|----|----|
| Y2 | Cb | Y2 | Cb | Y2 | Cb | Y2 | Cb | Y2 | Cb |
| Cr | Y1 | Cr | Y1 | Cr | Y1 | Cr | Y1 | Cr | Y1 |
| Y2 | Cb | Y2 | Cb | Y2 | Cb | Y2 | Cb | Y2 | Cb |
| Cr | Y1 | Cr | Y1 | Cr | Y1 | Cr | Y1 | Cr | Y1 |
| Y2 | Cb | Y2 | Cb | Y2 | Cb | Y2 | Cb | Y2 | Cb |
| Cr | Y1 | Cr | Y1 | Cr | Y1 | Cr | Y1 | Cr | Y1 |
| Y2 | Cb | Y2 | Cb | Y2 | Cb | Y2 | Cb | Y2 | Cb |
| Cr | Y1 | Cr | Y1 | Cr | Y1 | Cr | Y1 | Cr | Y1 |
| Y2 | Cb | Y2 | Cb | Y2 | Cb | Y2 | Cb | Y2 | Cb |

IMAGE PROCESSING DEVICE AND IMAGE PROCESSING METHOD

BACKGROUND

The present technology relates to an image processing device and an image processing method, and particularly to enabling a noise-removed image of excellent image quality without a loss of sharpness in edge parts to be generated in removing noise from an image.

In related art, an image processing device removes noise from an image when extracting edge information from the image and performing image processing, for example, because the extraction of the edge information is inevitably affected by a noise part when the noise part is included in the image. In addition, in noise removal, performing image matching processing using edge information, for example, presents a problem in that the matching processing takes much time or matching accuracy is not improved. In order to solve such a problem, an image processing device removes noise by smoothing processing using for example an averaging filter or a Gaussian filter. However, when noise is removed by the smoothing processing, edge parts are blurred more, and it becomes difficult to extract edge information.

Accordingly, an image processing device performs filter processing using a median filter, thereby removing noise in the form of dots without losing the sharpness of edge parts. In addition, Japanese Patent Laid-Open No. 2006-014024 (hereinafter referred to as Patent Document 1) discloses smoothing processing performed using only pixels whose differences in luminance value are within a predetermined threshold value, thereby enabling the reduction of false contours and noise without blurring contours while retaining the contours of an input signal.

In addition, when noise in a large region is desired to be removed, filter operation in a wide range is necessary. In this case, simply widening a filter range invites an increase in the scale of an arithmetic circuit and processing time. In order to deal with this, Japanese Patent Laid-Open No. 2010-157163 discloses performing filter processing after reducing an input image.

SUMMARY

When filter processing is performed after an input image is reduced, a chromatic blur occurs at an edge or the like, and invites degradation in image quality. A chromatic blur at an edge in a color of red, in particular, is perceived easily.

It is accordingly desirable to provide an image processing device and an image processing method that can provide an image of excellent image quality without a loss of sharpness in edge parts even when performing noise removal.

According to a first embodiment of the present technology, there is provided an image processing device including: a reducing section configured to generate a plurality of reduced images by reducing an input image at a plurality of reduction ratios; a noise removal processing section configured to generate noise-removed images by performing noise removal processing on each of the reduced images; an enlarging section configured to generate enlarged images equal to each other in size by enlarging each of the noise-removed images; and a mixing section configured to generate an output image by mixing two or more different enlarged images of the enlarged images with each other.

In the present technology, an input image is reduced at a plurality of reduction ratios, and noise-removed images are generated by performing noise removal processing on each of a plurality of reduced images. The noise removal processing section is formed by using a plurality of kinds of filters, and has a rearrangeable filter configuration. For example, on a basis of a result of determination of the color of the input image, a first filter configuration with high noise removal performance is used for a particular color, and a second filter configuration with high processing speed is used for other than the particular color. In addition, the filter configuration is set according to the reduction ratios. The noise-removed images are enlarged to enlarged images equal to each other in size, and an output image is generated by mixing two or more different enlarged images with each other. A mixing ratio between the enlarged images to be mixed with each other is calculated on the basis of correlation between the enlarged images to be mixed with each other. For example, the color-difference signals of the enlarged images to be mixed with each other are used to determine the correlation between the enlarged images, and the mixing ratio is calculated such that the ratio of an image having a high reduction ratio is increased as the correlation is decreased. In addition, on the basis of the result of determination of the color of the input image, the mixing ratio between the images to be mixed with each other is increased or decreased for a particular color. For example, when the input image is of the particular color, the ratio of an image having a high reduction ratio is increased.

According to a second embodiment of the present technology, there is provided an image processing method including: generating a plurality of reduced images by reducing an input image at a plurality of reduction ratios; generating noise-removed images by performing noise removal processing on each of the reduced images; generating enlarged images equal to each other in size by enlarging each of the noise-removed images; and generating an output image by mixing two or more different enlarged images of the enlarged images with each other.

According to the present technology, an input image is reduced at a plurality of reduction ratios, and noise-removed images are generated by performing noise removal processing on each of a plurality of reduced images. In addition, enlarged images equal to each other in size are generated by enlarging each of the noise-removed images, and an output image is generated by mixing two or more different enlarged images with each other. Because noise removal is thus applied to the images reduced at the plurality of reduction ratios, chromatic blurs in edge parts of the respective enlarged images are different from each other. Mixing two or more different enlarged images with each other can provide an image of excellent image quality without a loss of sharpness in edge parts.

BRIEF DESCRIPTION OF THE DRAWINGS

FIG. 4 is a diagram illustrating a data arrangement of an input image and an output image;

DETAILED DESCRIPTION OF THE PREFERRED EMBODIMENTS

Modes for carrying out the present technology will hereinafter be described. Incidentally, description will be made in the following order.
1. Configuration of System Using Image Processing Device
2. First Embodiment
   2-1. Configuration of First Embodiment
   2-2. Operation of First Embodiment
3. Second Embodiment
   3-1. Configuration of Second Embodiment
   3-2. Operation of Second Embodiment
4. Third Embodiment
   4-1. Configuration of Third Embodiment
   4-2. Operation of Third Embodiment

1. Configuration of System Using Image Processing Device

Figure 1:
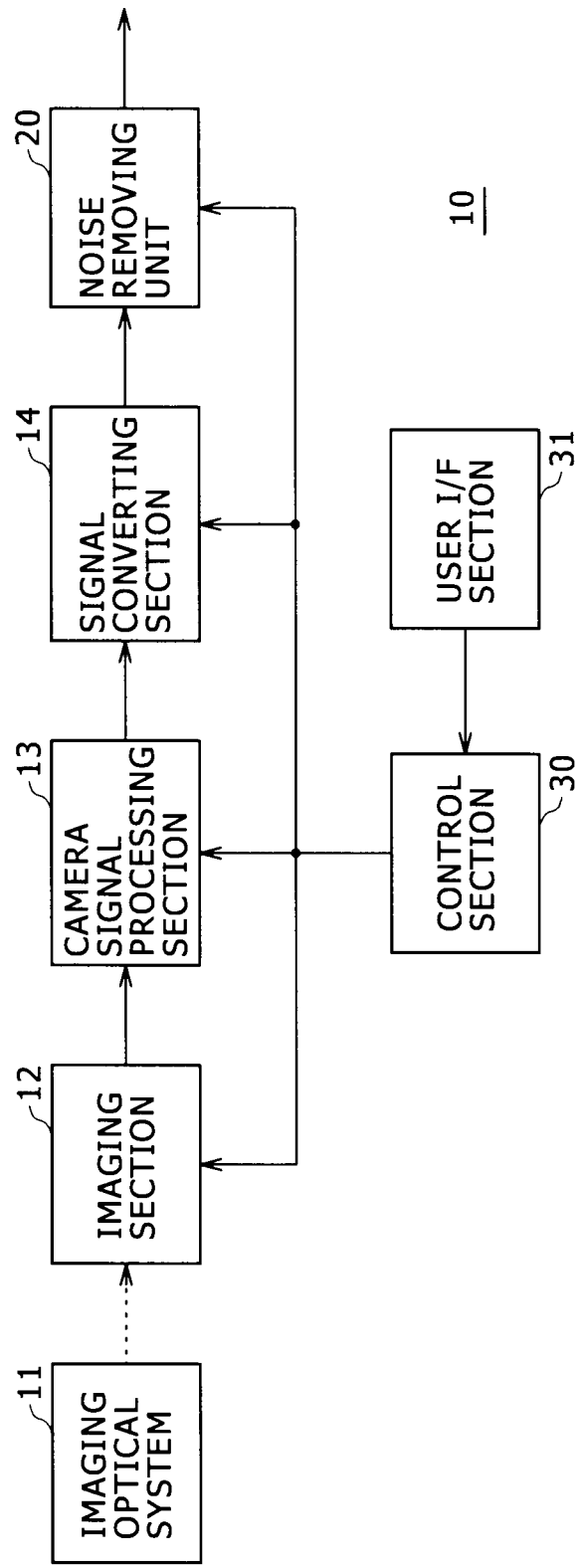
FIG. 1 is a diagram illustrating a configuration of an imaging device.

FIG. 1 illustrates a configuration of a system using an image processing device according to an embodiment of the present technology, which system is for example an imaging device. The imaging device 10 includes an imaging optical system 11, an imaging section 12, a camera signal processing section 13, a signal converting section 14, a noise removing unit 20, and a control section 30.

The imaging optical system 11 mainly includes a lens. The imaging optical system 11 forms an optical image of a subject not shown in the figure on a light receiving surface of the imaging section 12.

The imaging section 12 is formed by using a solid-state imaging element such as a CMOS (Complementary Metal-Oxide Semiconductor), a CCD (Charge-Coupled Device), or the like. The imaging section 12 generates an imaging signal corresponding to the optical image formed on the light receiving surface by the imaging optical system 11. In addition, the imaging section 12 subjects the imaging signal to correlated double sampling (CDS) processing, analog amplification processing, A/D conversion processing, and the like, and outputs a resulting image signal to the camera signal processing section 13.

The camera signal processing section 13 subjects the image signal supplied from the imaging section 12 to processing such as gamma correction, luminance adjustment, color correction, and the like. The camera signal processing section 13 outputs the image signal after the processing to the signal converting section 14.

The signal converting section 14 performs signal conversion to convert the image signal supplied from the camera signal processing section 13 into an image signal of a predetermined system, for example a luminance signal and a color-difference signal. The signal converting section 14 outputs the image signal to the noise removing unit 20.

The noise removing unit 20 corresponding to an image processing device according to an embodiment of the present technology subjects the image signal supplied from the signal converting section 14 to noise removal processing. Incidentally, a configuration and operation of the noise removing unit 20 will be described later.

The control section 30 is connected with a user interface (I/F) section 31. The user I/F section 31 is to receive operating input from a user. The user I/F section 31 includes a power switch, various operating keys such as a shutter key, a zoom key, and the like, and operating keys for making menu display, a selection of a menu item, and various settings. The user I/F section outputs an operating signal corresponding to a user operation to the control section 30.

The control section 30 is formed by using a microcomputer or the like. The control section 30 executes a stored program to control various parts on the basis of the operating signal so that the operation of the imaging device 10 is an operation corresponding to the user operation.

2. First Embodiment

2-1. Configuration of First Embodiment

Figure 2:
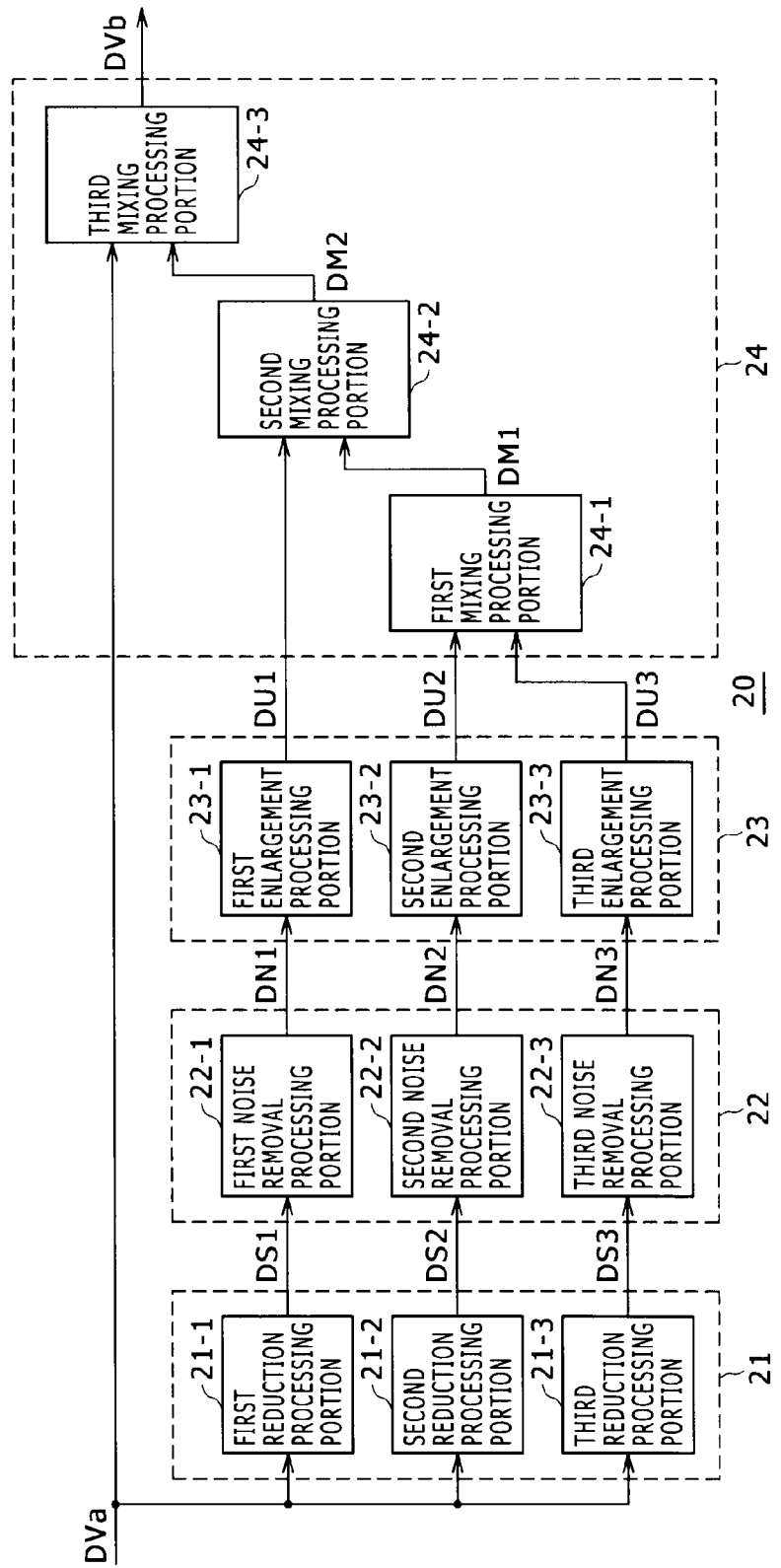
FIG. 2 is a diagram showing a configuration of a first embodiment.

FIG. 2 shows a configuration of a first embodiment of the noise removing unit corresponding to an image signal processing section according to an embodiment of the present technology. The noise removing unit 20 includes a reducing section 21, a noise removal processing section 22, an enlarging section 23, and a mixing section 24.

The reducing section 21 reduces an input image. The reducing section 21 includes for example a first reduction processing portion 21-1, a second reduction processing portion 21-2, and a third reduction processing portion 21-3. The first reduction processing portion 21-1 reduces the input image to a first size (for example a ⅓-fold size: a reduction ratio of 33.33%), and outputs the image signal of the first reduced image to the noise removal processing section 22. The second reduction processing portion 21-2 reduces the input image to a second size (for example a ⅑-fold size: a reduction ratio of 11.11%), and outputs the image signal of the second reduced image to the noise removal processing section 22. The third reduction processing portion 21-3 reduces the input image to a third size (for example a 1/18-fold size: a reduction ratio of 5.56%), and outputs the image signal of the third reduced image to the noise removal processing section 22.

Incidentally, sizes in embodiments represent numbers of pixels. For example, a 1/n-fold size indicates 1/n times the number of pixels in a horizontal direction and a vertical direction, and an n-fold size indicates n times the number of pixels in the horizontal direction and the vertical direction.

The reducing section 21 is not limited to the above-described reduction ratios, but may be configured to generate the image signals of reduced images at a plurality of reduction ratios according to specified values. In addition, the reducing section may be configured by a single arithmetic section having a plurality of reduction ratios according to specified values.

The noise removal processing section 22 performs noise removal processing on the image signals supplied from the reducing section 21. The noise removal processing section 22 includes for example a first noise removal processing portion 22-1, a second noise removal processing portion 22-2, and a third noise removal processing portion 22-3. Each of the noise removal processing portions is formed by an adjacent pixel averaging filter such as a low-pass filter, an epsilon filter, a bilateral filter, or the like, or a combination of these filters. The first noise removal processing portion 22-1 performs filter processing on the image signal output from the first reduction processing portion 21-1 in the reducing section 21, and thereby removes the noise of the image signal. The first noise removal processing portion 22-1 outputs the image signal to the enlarging section 23. The second noise removal processing portion 22-2 performs filter processing on the image signal output from the second reduction processing portion 21-2 in the reducing section 21, and thereby removes the noise of the image signal. The second noise removal processing portion 22-2 outputs the image signal to the enlarging section 23. The third noise removal processing portion 22-3 performs filter processing on the image signal output from the third reduction processing portion 21-3 in the reducing section 21, and thereby removes the noise of the image signal. The third noise removal processing portion 22-3 outputs the image signal to the enlarging section 23.

The enlarging section 23 performs image enlargement using the image signals supplied from the noise removal processing section 22. The enlarging section 23 includes for example a first enlargement processing portion 23-1, a second enlargement processing portion 23-2, and a third enlargement processing portion 23-3. Each of the enlargement processing portions performs image enlargement by using a method such as Nearest Neighbor, Bilinear, Bicubic, or the like. The first enlargement processing portion 23-1 performs enlargement processing using the image signal output from the first noise removal processing portion 22-1 in the noise removal processing section 22, and thereby generates the image signal of an enlarged image obtained by enlarging the image to a first size (for example a three-fold size). The first enlargement processing portion 23-1 outputs the image signal of the enlarged image to the mixing section 24. The second enlargement processing portion 23-2 performs enlargement processing using the image signal output from the second noise removal processing portion 22-2 in the noise removal processing section 22, and thereby generates the image signal of an enlarged image obtained by enlarging the image to a second size (for example a nine-fold size). The second enlargement processing portion 23-2 outputs the image signal of the enlarged image to the mixing section 24. The third enlargement processing portion 23-3 performs enlargement processing using the image signal output from the third noise removal processing portion 22-3 in the noise removal processing section 22, and thereby generates the image signal of an enlarged image obtained by enlarging the image to a third size (for example a 18-fold size). The third enlargement processing portion 23-3 outputs the image signal of the enlarged image to the mixing section 24.

Incidentally, when the noise removing unit 20 sets the enlargement factors of the enlarging section 23 to factors that return the image reduced in the reducing section 21 to the original size, the size of the output images can be made equal to that of the input image. In addition, the enlargement factors of the enlarging section may be other enlargement ratios when the numbers of pixels of the enlarged images output from the respective enlargement processing portions are the same number of pixels. In addition, the enlarging section 23 may be a single arithmetic section having a plurality of enlargement ratios according to specified values.

The mixing section 24 performs mixing processing on the images output from the enlarging section 23. The mixing section 24 includes for example a first mixing processing portion 24-1, a second mixing processing portion 24-2, and a third mixing processing portion 24-3. The first mixing processing portion 24-1 performs mixing processing using the image signal output from the second enlargement processing portion 23-2 in the enlarging section 23 and the image signal output from the third enlargement processing portion 23-3, and thereby generates the image signal of a first mixed image. The first mixing processing portion 24-1 outputs the generated image signal of the first mixed image to the second mixing processing portion 24-2. The second mixing processing portion 24-2 performs mixing processing using the image signal of the first mixed image output from the first mixing processing portion 24-1 and the image signal output from the first enlargement processing portion 23-1 in the enlarging section 23, and thereby generates the image signal of a second mixed image. The second mixing processing portion 24-2 outputs the generated image signal of the second mixed image to the third mixing processing portion 24-3. The third mixing processing portion 24-3 performs mixing processing using the image signal of the second mixed image output from the second mixing processing portion 24-2 and the image signal of the input image, and thereby generates the image signal of an output image.

Incidentally, in the following description, signals input to the respective parts and signals output from the respective parts will be described as follows.

The image signal DVa input to the first reduction processing portion 21-1, the second reduction processing portion 21-2, and the third reduction processing portion 21-3

$$DVa = Y1(x,y), Y2(x,y), Cb(x,y), Cr(x,y)$$

The image signal DS1 output from the first reduction processing portion 21-1

$$DS1 = ds1\_Y1(x',y'), ds1\_Y2(x',y'), ds1\_cb(x',y'), ds1\_cr(x',y')$$

The image signal DS2 output from the second reduction processing portion 21-2

$$DS2 = ds2\_Y1(x'',y''), ds2\_Y2(x'',y''), ds2\_cb(x'',y''), ds2\_cr(x'',y'')$$

The image signal DS3 output from the third reduction processing portion 21-3

$$DS3 = ds3\_Y1(x''',y'''), ds3\_Y2(x''',y'''), ds3\_cb(x''',y'''), ds3\_cr(x''',y''')$$

The image signal DN1 output from the first noise removal processing portion 22-1

$$DN1 = ds1\_Y1(x',y'), ds1\_Y2(x',y'), nr1\_cb(x',y'), nr2\_cr(x',y')$$

The image signal DN2 output from the second noise removal processing portion 22-2

$$DN2 = ds2\_Y1(x'',y''), ds2\_Y2(x'',y''), nr2\_cb(x'',y''), nr2\_cr(x'',y'')$$

The image signal DN3 output from the third noise removal processing portion 22-3

$$DN3 = ds3\_Y1(x''',y'''), ds3Y2(x''',y'''), nr3\_cb(x''',y'''), nr3\_cr(x''',y''')$$

The image signal DU1 output from the first enlargement processing portion 23-1

$$DU1 = us1\_Y1(x,y), us1\_Y2(x,y), us1\_cb(x,y), us1\_cr(x,y)$$

The image signal DU2 output from the second enlargement processing portion 23-2

$$DU2 = us2\_Y1(x,y), us2\_Y2(x,y), us2\_cb(x,y), us2\_cr(x,y)$$

The image signal DU3 output from the third enlargement processing portion 23-3

$$DU3=us3\_Y1(x,y), us3\_Y2(x,y), us3\_cb(x,y), us3\_cr(x,y)$$

The image signal DM1 output from the first mixing processing portion 24-1

$$DM1=b11\_Y1(x,y), b11\_Y2(x,y), b11\_cb(x,y), b11cr(x,y)$$

The image signal DM2 output from the second mixing processing portion 24-2

$$DM2=b12\_Y1(x,y), b12\_Y2(x,y), b12\_cb(x,y), b12\_cr(x,y)$$

The image signal DVb output from the third mixing processing portion 24-3

$$DVb=b13\_Y1(x,y), b13\_Y2(x,y), b13\_cb(x,y), b13\_cr(x,y)$$

2-2. Operation of First Embodiment

Figure 3:
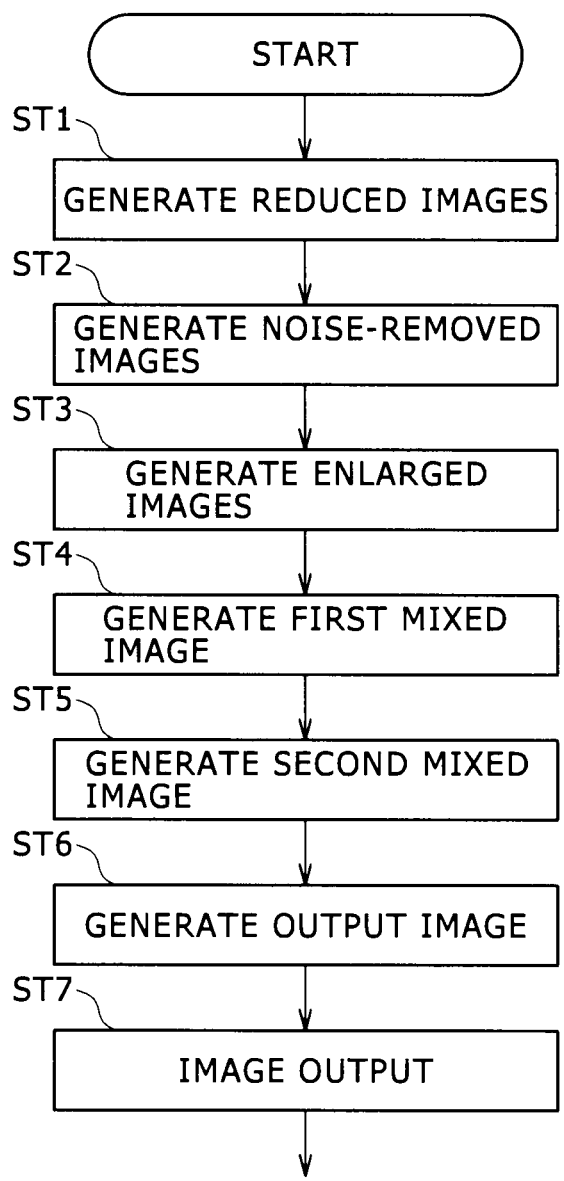
FIG. 3 is a diagram showing the operation of the first embodiment.

FIG. 3 is a flowchart illustrating the operation of the first embodiment, that is, the operation of the noise removing unit 20. In step ST1, the noise removing unit 20 generates reduced images. The reducing section 21 in the noise removing unit 20 generates the image signals of the reduced images using an image signal supplied from the signal converting section 14. The process then proceeds to step ST2.

In step ST2, the noise removing unit 20 generates noise-removed images. The noise removal processing section 22 in the noise removing unit 20 performs noise removal processing using the image signals of the reduced images, and thereby generates the image signals of the noise-removed images. The process then proceeds to step ST3.

In step ST3, the noise removing unit 20 generates enlarged images. The enlarging section 23 in the noise removing unit 20 performs image enlargement processing using the image signals of the noise-removed images, and thereby generates the image signals of the enlarged images. The process then proceeds to step ST4.

In step ST4, the noise removing unit 20 generates a first mixed image. The mixing section 24 in the noise removing unit 20 performs mixing processing in the first mixing processing portion 24-1, and thereby generates the image signal of the first mixed image. The process then proceeds to step ST5.

In step ST5, the noise removing unit 20 generates a second mixed image. The mixing section 24 in the noise removing unit 20 performs mixing processing in the second mixing processing portion 24-2, and thereby generates the image signal of the second mixed image. The process then proceeds to step ST6.

In step ST6, the noise removing unit 20 generates an output image. The mixing section 24 in the noise removing unit 20 performs mixing processing in the third mixing processing portion 24-3, that is, performs mixing processing using the image signal of the second mixed image and the image signal of the input image, and thereby generates the image signal of the output image. The process then proceeds to step ST7.

In step ST7, the noise removing unit 20 performs image output. The noise removing unit 20 outputs the image signal of the output image generated in the mixing section 24.

A concrete operation will next be described. FIG. 4 illustrates a data arrangement of the input image and the output image. The following description will be made supposing that an image signal, that is, the signal of a unit pixel includes luminance signals Y1 and Y2 and color-difference signals Cr and Cb. In addition, the signals of coordinates (x, y) of interest will be represented as Y1(x, y), Y2(x, y), Cb(x, y), and Cr(x, y).

Figure 5A:
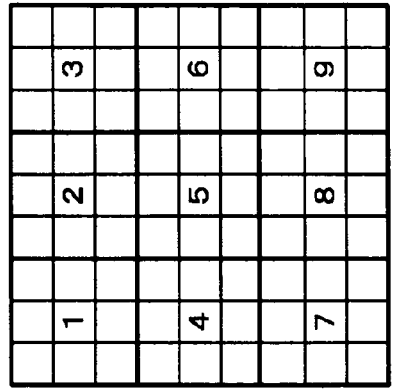
FIGS. 5A, 5B, and 5C are diagrams showing the reduction and enlargement of an image.
Figure 5B:
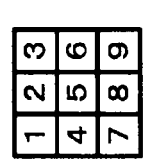
Figure 5C:
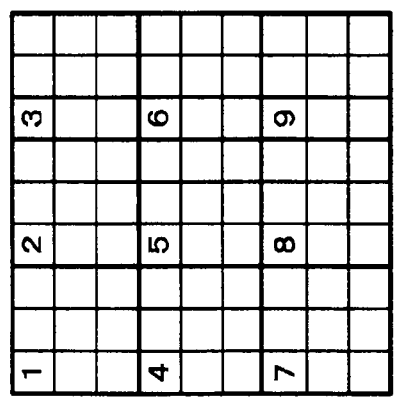

The noise removing unit 20 performs noise removal using a reduced image obtained by reducing an input image, and thereby generates a noise-removed image. In addition, the noise removing unit 20 generates an enlarged image by enlarging the noise-removed image. FIGS. 5A to 5C shows the reduction and enlargement of an image, and represents for example a case where the first reduction processing portion 21-1 in the reducing section 21 generates a reduced image having a ⅓-fold size, and the first enlargement processing portion 23-1 in the enlarging section 23 generates an enlarged image having a three-fold size.

The first reduction processing portion 21-1 averages signals in a pixel range of a reciprocal of the reduction ratio in a horizontal direction and a vertical direction, that is, in a range of three horizontal pixels×three vertical pixels, and sets the average as the signal of one pixel in the reduced image. The first reduction processing portion 21-1 performs such processing in each of ranges of three horizontal pixels×three vertical pixels. The first reduction processing portion 21-1 thereby generates a ⅓ reduced image shown in FIG. 5B from an image shown in FIG. 5A.

The first enlargement processing portion 23-1 performs image enlargement using a method such as Nearest Neighbor, Bilinear, Bicubic, or the like. When Nearest Neighbor is used, for example, the first enlargement processing portion 23-1 calculates the position of coordinates before the enlargement at which coordinates a pixel after the enlargement was situated, and uses the signal of a pixel nearest to the calculated position as the signal of the pixel after the enlargement. The first enlargement processing portion 23-1 repeats such processing, and thereby generates a x3 enlarged image shown in FIG. 5C from the image shown in FIG. 5B. Reduced images and enlarged images can also be generated at other reduction ratios and enlargement ratios by performing similar processing. Incidentally, in a case of three or more different reduction ratios as in the present embodiment, an averaging range of 18 horizontal pixels and 18 vertical pixels as in the third reduction processing portion 21-3, which has a largest averaging range, and a filter region of 9 horizontal pixels and 9 vertical pixels in the third noise removal processing portion 22-3, a filter range is 162 (=18×9) horizontally and vertically in quasi terms. Hence, the noise removal processing of the third noise removal processing portion 22-3 is effective against low-frequency noise.

In addition, the reducing section 21 may produce a fraction at a terminal part of reduction processing depending on the reduction ratio. In this case, the reducing section 21 may change the number of pixels to be averaged only at the terminal part. In addition, the reducing section 21 may increase or decrease the number of pixels of the input image so as not to produce a fraction.

The data of the reduced images output from the respective reduction processing portions in the reducing section 21 may be sequentially supplied to the noise removal processing section 22, or may be supplied to the noise removal processing section 22 after being stored in a storage area within or without the system temporarily. When the data of the reduced images is sequentially supplied from the reducing section 21 to the noise removal processing section 22, the noise removal processing section 22 can start noise removal processing from a part whose reduction processing has been completed.

The noise removal processing section 22 performs averaging filter processing on each pixel (x, y) of the reduced images. Various kinds of filters such as a simple low-pass filter, an epsilon filter, a bilateral filter, and the like can be used in the averaging filter processing. In addition, a range where noise can be reduced is determined by a filter range. Thus, when the noise removal processing portions 22-1, 22-2, and 22-3 use a same noise removing filter, the noise removal processing portions 22-1, 22-2, and 22-3 can perform noise removal processing whose strength increases in order of the first noise removal processing portion 22-1, the second noise removal processing portion 22-2, and the third noise removal processing portion 22-3.

The first noise removal processing portion 22-1 sets a threshold value on the basis of the luminance signal of the first reduced image generated in the first reduction processing portion 21-1. For example, an average value of the luminance signal of the first reduced image is set as the threshold value. The second noise removal processing portion 22-2 sets a threshold value on the basis of the luminance signal of the second reduced image generated in the second reduction processing portion 21-2. For example, an average value of the luminance signal of the second reduced image is set as the threshold value. The third noise removal processing portion 22-3 sets a threshold value on the basis of the luminance signal of the third reduced image generated in the third reduction processing portion 21-3. For example, an average value of the luminance signal of the third reduced image is set as the threshold value.

Thus, the noise removal processing section 22 sets the threshold values on the basis of the input image signals, determines image parts in which to perform noise removal using the set threshold values, and performs noise removal processing on the determined image parts.

The numbers of pixels of the reduced images decrease in order of the ⅓ reduced image, the ⅙ reduced image, and the ⅟₁₈ reduced image. The numbers of pixels that the respective noise removal processing portions need to process also decrease in order of the first noise removal processing portion 22-1, the second noise removal processing portion 22-2, and the third noise removal processing portion 22-3. Therefore, when the noise removal processing portions perform noise removal processing in parallel with each other, and start the noise removal processing simultaneously, waiting times occur in the second noise removal processing portion 22-2 and the third noise removal processing portion 22-3 before the first noise removal processing portion 22-1 completes the processing. Hence, noise removal performance is improved by using the waiting times. Alternatively, the noise removal processing section 22 is scheduled so as not to cause the waiting times.

Figure 6:
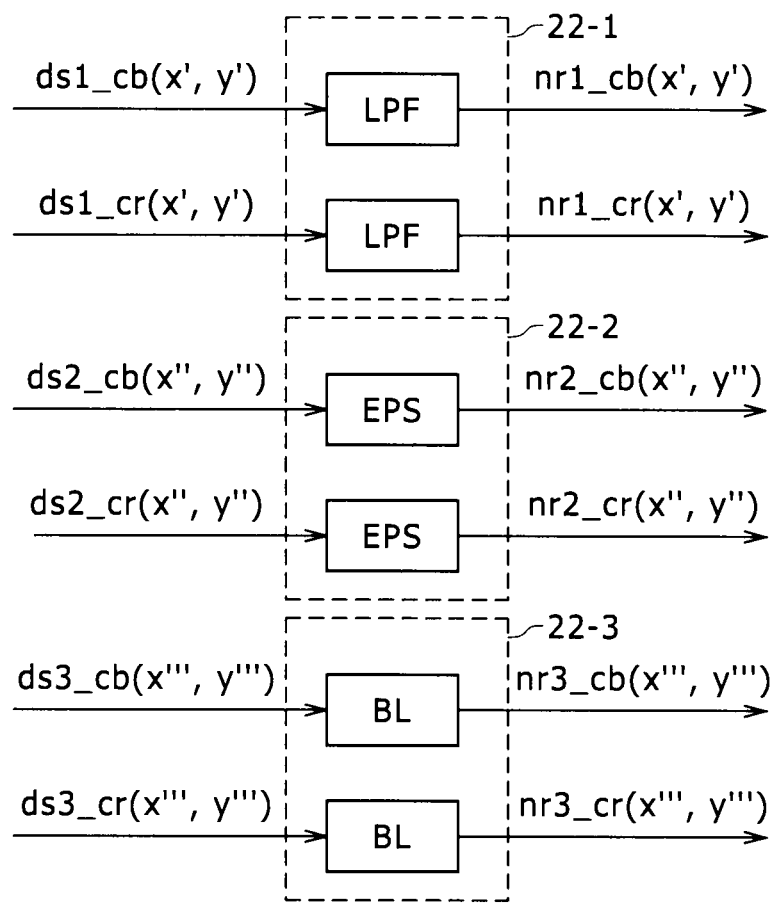
FIG. 6 is a diagram showing a configuration of a noise removal processing section whose noise removal performance is improved by using waiting times.

FIG. 6 shows a configuration of the noise removal processing section 22 whose noise removal performance is improved by using the waiting times. The waiting times can be used as times for improving noise removal performance by increasing an operation scale. Hence, because of a smaller number of pixels that the second noise removal processing portion 22-2 needs to process than the first noise removal processing portion 22-1, the second noise removal processing portion 22-2 performs noise removal processing using a filter with higher noise removal performance than that of the first noise removal processing portion 22-1. For example, the second noise removal processing portion 22-2 performs noise removal processing using an epsilon filter (EPS) with higher noise removal performance than a simple low-pass filter (LPF) used in the first noise removal processing portion 22-1. Similarly, because of a smaller number of pixels that the third noise removal processing portion 22-3 needs to process than the second noise removal processing portion 22-2, the third noise removal processing portion 22-3 performs noise removal processing using a filter with higher noise removal performance than that of the second noise removal processing portion 22-2. For example, the third noise removal processing portion 22-3 performs noise removal processing using a bilateral filter (BL) with higher noise removal performance than the epsilon filter (EPS) used in the second noise removal processing portion 22-2.

When scheduling is performed so as not to cause a waiting time, a noise removal processing portion that has completed processing performs noise removal for an unprocessed part that another noise removal processing portion is in charge of. In addition, the noise removal processing performed in each noise removal processing portion may be rearranged so as to reduce time differences between ends of processing in the respective noise removal processing portions.

Figure 7:
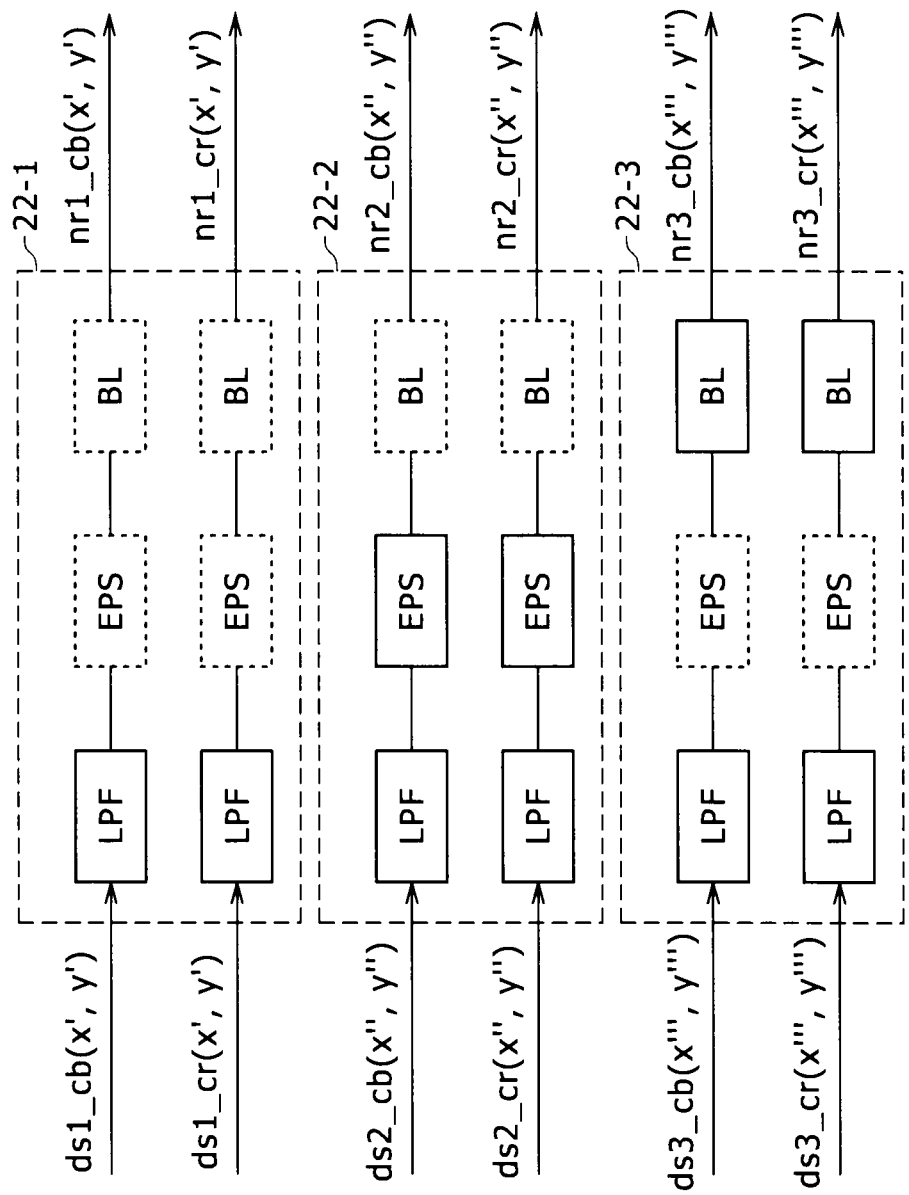
FIG. 7 is a diagram showing a configuration of noise removal processing sections allowing the rearrangement of noise removal processing.

FIG. 7 shows a configuration of the noise removal processing portions allowing the rearrangement of noise removal processing. The noise removal processing portions 22-1, 22-2, and 22-3 include for example simple low-pass filters (LPF), epsilon filters (EPS), and bilateral filters (BL). In addition, the noise removal processing portions 22-1, 22-2, and 22-3 allows the rearrangement of filters for performing noise removal processing, and sets filters for performing noise removal processing so as to reduce time differences between ends of the noise removal processing. For example, the first noise removal processing portion 22-1 performs noise removal processing using only the simple low-pass filters (LPF). The second noise removal processing portion 22-2 performs noise removal processing using the simple low-pass filters (LPF) and the epsilon filters. The third noise removal processing portion 22-3 performs noise removal processing using the simple low-pass filters (LPF) and the bilateral filters. Incidentally, filters indicated by broken lines in FIG. 7 output the input signals without performing noise removal processing on the input signals.

Further, when the noise removal processing can be rearranged, a filter processing range is reduced for an input signal having a high signal level and negligible noise. Alternatively, it is possible to reduce excessive noise removal processing and increase the speed of the processing by changing to a simple filter configuration. In addition, when the filter processing range is made variably, it is possible to optimize a noise removal frequency characteristic according to the input image.

The enlarging section 23 enlarges the reduced images from which noise is removed. For example, the enlarging section 23 enlarges the images to the size before the images are reduced in the reducing section 21. In addition, when the images are output from the noise removing unit 20 in a predetermined size different from that of the input image, the enlargement processing portions 23-1, 23-2, and 23-3 of the enlarging section 23 enlarge the images to the predetermined size.

The mixing section 24 performs mixing processing on the image signals of the enlarged images, and thereby generates the image signal of a mixed image. The mixing section 24 calculates a mixing ratio between the enlarged images to be mixed with each other on the basis of a correlation between the enlarged images to be mixed with each other. For example, when the enlarged images to be mixed with each other are visually similar to each other at certain coordinates (x, y), the mixing section 24 increases the ratio of the enlarged image whose reduction rate is high and whose noise is removed even in low frequencies. In addition, when the enlarged images to be mixed with each other are not visually similar to each other, the mixing section 24 increases the ratio of the enlarged image whose blur due to enlargement is small.

As for determination as to whether the enlarged images to be mixed with each other are visually similar to each other, when a chromatic blur of a red color system is to be reduced, for example, a difference between the color-difference signals Cr is calculated. It is determined that the enlarged images to be mixed with each other are visually similar to each other when the difference is less than a threshold value set in advance, and it is determined that the enlarged images to be mixed with each other are not visually similar to each other when the difference is equal to or more than the threshold value. In addition, the color-difference signals Cr are mixed with each other according to a result of the determination.

For example, the first mixing processing portion 24-1 mixes the second enlarged image generated in the second enlargement processing portion 23-2 and the third enlarged image generated in the third enlargement processing portion 23-3 with each other. The first mixing processing portion 24-1 calculates a difference Dcr23 (absolute value, $0 \leq Dcr23 \leq 254$) between the color-difference signals Cr ($-127 \leq Cr \leq 127$) of the second enlarged image and the third enlarged image at certain coordinates (x, y) as in Equation (1).

$$Dcr23(x,y)=|us3\_cr(x,y)-us2\_cr(x,y)| \quad (1)$$

The mixing ratio is set on the basis of the difference Dcr23. For example, when the difference Dcr23 is less than a threshold value "10," the mixing ratio Bcr23(x, y) of the third enlarged image to the second enlarged image is determined on the basis of Equation (2). In addition, when the difference Dcr23 is equal to or more than the threshold value "10," the mixing ratio Bcr23(x, y) of the third enlarged image to the second enlarged image is determined on the basis of Equation (3).

$$Bcr23(x,y)=Dcr23/10 \, (0 \leq Dcr23 \leq 10) \quad (2)$$

$$Bcr23(x,y)=1 \, (10 \leq Dcr23) \quad (3)$$

That is, the ratio of the second enlarged image is increased as the difference Dcr23 becomes larger, and only the second enlarged image is used when the difference Dcr23 is equal to or more than the threshold value.

The first mixing processing portion 24-1 specifically calculates the color-difference signal b11_cr(x, y) at the coordinates (x, y) of the first mixed image by performing the operation of Equation (4).

$$b11\_cr(x,y)=Bcr23(x,y) \cdot us2\_cr(x,y)+(1-Bcr23(x,y)) \cdot us3\_cr(x,y) \quad (4)$$

The second mixing processing portion 24-2 mixes the first mixed image generated in the first mixing processing portion 24-1 and the first enlarged image generated in the first enlargement processing portion 23-1 with each other. The second mixing processing portion 24-2 calculates a difference Dcr123 (absolute value: $0 \leq Dcr123 \leq 254$) between the color-difference signals Cr ($-127 \leq Cr \leq 127$) of the first mixed image and the first enlarged image at certain coordinates (x, y) as in Equation (5).

$$Dcr123(x,y)=|b11\_cr(x,y)-us1\_cr(x,y)| \quad (5)$$

The mixing ratio is set on the basis of the difference Dcr123. For example, when the difference Dcr123 is less than a threshold value "10," the mixing ratio Bcr123(x, y) of the first enlarged image to the first mixed image is determined on the basis of Equation (6). In addition, when the difference Dcr123 is equal to or more than the threshold value "10," the mixing ratio Bcr123(x, y) of the first enlarged image to the first mixed image is determined on the basis of Equation (7).

$$Bcr123(x,y)=Dcr123/10 \, (0 \leq Dcr123 \leq 10) \quad (6)$$

$$Bcr123(x,y)=1 \, (10 \leq Dcr123) \quad (7)$$

That is, the ratio of the first enlarged image is increased as the difference Dcr123 becomes larger, and only the first enlarged image is used when the difference Dcr123 is equal to or more than the threshold value.

The second mixing processing portion 24-2 specifically calculates the color-difference signal b12_cr(x, y) at the coordinates (x, y) of the second mixed image by performing the operation of Equation (8).

$$b12\_cr(x,y)=Bcr123(x,y) \cdot us1\_cr(x,y)+(1-Bcr123(x,y)) \cdot b11\_cr(x,y) \quad (8)$$

The third mixing processing portion 24-3 mixes the second mixed image generated in the second mixing processing portion 24-2 and the input image with each other. The third mixing processing portion 24-3 calculates a difference Dcr0123 (absolute value: $0 \leq Dcr0123 \leq 254$) between the color-difference signals Cr ($-127 \leq Cr \leq 127$) of the second mixed image and the input image at certain coordinates (x, y) as in Equation (9).

$$Dcr0123(x,y)=|b12\_cr(x,y)-cr(x,y)| \quad (9)$$

The mixing ratio is set on the basis of the difference Dcr0123. For example, when the difference Dcr0123 is less than a threshold value "10," the mixing ratio Bcr0123(x, y) of the input image to the second mixed image is determined on the basis of Equation (10). In addition, when the difference Dcr0123 is equal to or more than the threshold value "10," the mixing ratio Bcr0123(x, y) of the input image to the second mixed image is determined on the basis of Equation (11).

$$Bcr0123(x,y)=Dcr0123/10 \, (0 \leq Dcr0123 < 10) \quad (10)$$

$$Bcr0123(x,y)=1 \, (10 \leq Dcr0123) \quad (11)$$

That is, the ratio of the input image is increased as the difference Dcr0123 becomes larger, and only the input image is used when the difference Dcr0123 is equal to or more than the threshold value.

The third mixing processing portion 24-3 specifically calculates the color-difference signal b13_cr(x, y) at the coordinates (x, y) of the output image by performing the operation of Equation (12).

$$b13\_cr(x,y)=Bcr0123(x,y) \cdot cr(x,y)+(1-Bcr0123(x,y)) \cdot b12\_cr(x,y) \quad (12)$$

In addition, when the input image has poor accuracy, or for example when the input image is a dark image having a large amount of noise, the second mixed image may be set as the output image without undergoing the processing of the third mixing processing portion 24-3, by setting the mixing ratio Bcr0123=0.

Further, while the above description has been made of the processing for the color-difference signal Cr, a chromatic blur of a blue color system can be prevented by similarly performing reduction processing, noise removal processing, enlargement processing, and mixing processing for the color-difference signal Cb.

The mixing section 24 calculates a difference between color-difference signals Cb. The mixing section 24 determines that the enlarged images to be mixed with each other are visually similar to each other when the difference is less than a threshold value set in advance. The mixing section 24 determines that the enlarged images to be mixed with each other are not visually similar to each other when the difference is equal to or more than the threshold value. In addition, the mixing section 24 mixes the color-difference signals Cb with each other according to a result of the determination.

For example, the first mixing processing portion 24-1 mixes the second enlarged image generated in the second enlargement processing portion 23-2 and the third enlarged image generated in the third enlargement processing portion 23-3 with each other. The first mixing processing portion 24-1 calculates a difference Dcb23 (absolute value, 0≤Dcb23≤254) between the color-difference signals Cb (−127≤Cb≤127) of the second enlarged image and the third enlarged image at certain coordinates (x, y) as in Equation (13).

$$Dcb23(x,y)=|us3\_cb(x,y)-us2\_cb(x,y)| \quad (13)$$

The mixing ratio is set on the basis of the difference Dcb23. For example, when the difference Dcb23 is less than a threshold value "10," the mixing ratio Bcb23(x, y) of the third enlarged image to the second enlarged image is determined on the basis of Equation (14). In addition, when the difference Dcb23 is equal to or more than the threshold value "10," the mixing ratio Bcb23(x, y) of the third enlarged image to the second enlarged image is determined on the basis of Equation (15).

$$Bcb23(x,y)=Dcb23/10(0 \le Dcb23<10) \quad (14)$$

$$Bcb23(x,y)=1(10 \le Dcb23) \quad (15)$$

That is, the ratio of the second enlarged image is increased as the difference Dcb23 becomes larger, and only the second enlarged image is used when the difference Dcb23 is equal to or more than the threshold value.

The first mixing processing portion 24-1 specifically calculates the color-difference signal b11_cb(x, y) at the coordinates (x, y) of the first mixed image by performing the operation of Equation (16).

$$b11\_cb(x,y)=Bcb23(x,y) \cdot us2\_cb(x,y)+(1-Bcb23(x,y)) \cdot us3cb(x,y) \quad (16)$$

The second mixing processing portion 24-2 mixes the first mixed image generated in the first mixing processing portion 24-1 and the first enlarged image generated in the first enlargement processing portion 23-1 with each other. The second mixing processing portion 24-2 calculates a difference Dcb123 (absolute value: 0 Dcb123≤254) between the color-difference signals Cb (−127≤Cb≤127) of the first mixed image and the first enlarged image at certain coordinates (x, y) as in Equation (17).

$$Dcb123(x,y)=|b11\_cb(x,y)-us1\_cb(x,y)| \quad (17)$$

The mixing ratio is set on the basis of the difference Dcb123. For example, when the difference Dcb123 is less than a threshold value "10," the mixing ratio Bcb123(x, y) of the first enlarged image to the first mixed image is determined on the basis of Equation (18). In addition, when the difference Dcb123 is equal to or more than the threshold value "10," the mixing ratio Bcb123(x, y) of the first enlarged image to the first mixed image is determined on the basis of Equation (19).

$$Bcb123(x,y)=Dcb123/10(0 \le Dcb123<10) \quad (18)$$

$$Bcb123(x,y)=1(10 \le Dcb123) \quad (19)$$

That is, the ratio of the first enlarged image is increased as the difference Dcb123 becomes larger, and only the first enlarged image is used when the difference Dcb123 is equal to or more than the threshold value.

The second mixing processing portion 24-2 specifically calculates the color-difference signal b12_cb(x, y) at the coordinates (x, y) of the second mixed image by performing the operation of Equation (20).

$$b12\_cb(x,y)=Bcb123(x,y) \cdot us1\_cb(x,y)+(1-Bcb123(x,y)) \cdot b11\_cb(x,y) \quad (20)$$

The third mixing processing portion 24-3 mixes the second mixed image generated in the second mixing processing portion 24-2 and the input image with each other. The third mixing processing portion 24-3 calculates a difference Dcb0123 (absolute value: 0≤Dcb0123≤254) between the color-difference signals Cb (−127≤Cb≤127) of the second mixed image and the input image at certain coordinates (x, y) as in Equation (21).

$$Dcb0123(x,y)=|b12\_cb(x,y)-cb(x,y)| \quad (21)$$

The mixing ratio is set on the basis of the difference Dcb0123. For example, when the difference Dcb0123 is less than a threshold value "10," the mixing ratio Bcb0123(x, y) of the input image to the second mixed image is determined on the basis of Equation (22). In addition, when the difference Dcb0123 is equal to or more than the threshold value "10," the mixing ratio Bcb0123(x, y) of the input image to the second mixed image is determined on the basis of Equation (23).

$$Bcb0123(x,y)=Dcb0123/10(0 \le Dcb0123<10) \quad (22)$$

$$Bcb0123(x,y)=1(10 \le Dcb0123) \quad (23)$$

That is, the ratio of the input image is increased as the difference Dcb0123 becomes larger, and only the input image is used when the difference Dcb0123 is equal to or more than the threshold value.

The third mixing processing portion 24-3 specifically calculates the color-difference signal b13_cb(x, y) at the coordinates (x, y) of the third mixed image by performing the operation of Equation (24).

$$b13\_cb(x,y)=Bcb0123(x,y) \cdot cb(x,y)+(1-Bcb0123(x,y)) \cdot b12\_cb(x,y) \quad (24)$$

In addition, when the input image has poor accuracy, the second mixed image may be set as the output image without undergoing the processing of the third mixing processing portion 24-3, by setting the mixing ratio Bcb0123=0.

Further, while the mixing section 24 calculates the mixing ratios individually using the color-difference signals Cr and Cb, the mixing ratios calculated in the processing for one color-difference signal may be used in the processing for the other color-difference signal. For example, the mixing ratios calculated for the color-difference signal Cr may be used as the mixing ratios in the processing for the color-difference signal Cb. Specifically, the mixing ratios Bcb23, Bcb123, and Bcb0123 are set as in Equations (25) to (27). In this case, the mixing section 24 does not need to calculate the mixing ratios using each of the color-difference signals. The mixing section 24 can therefore perform mixing processing at a higher speed than in the case of calculating the mixing ratios individually using each of the color-difference signals.

$$Bcb23=Bcr23 \quad (25)$$

$$Bcb123=Bcr123 \quad (26)$$

$$Bcb0123=Bcr0123 \quad (27)$$

In addition, the index for determining the mixing ratios is not limited to the difference between the color-difference signals of the images to be mixed with each other, but a difference according to visual characteristics may be used. In addition, when the image signal of the input image is that of an L*a*b* color system, the mixing ratios may be determined on the basis of Color Difference $\Delta E^{*}ab=[(\Delta L^{*})^2+(\Delta a^{*})^2+(\Delta b^{*})^2]^{1/2}$.

Thus, because noise is removed from images reduced at a plurality of reduction ratios, the chromatic blurs of edge parts in the respective enlarged images differ from each other. Therefore, when two or more different enlarged images are mixed with each other, an image of excellent image quality without a loss of sharpness of edge parts can be obtained. For example, the correlation between enlarged images to be mixed with each other is determined using the color-difference signals of the enlarged images to be mixed with each other, and the ratio of the enlarged image after the noise processing of a reduced image reduced at a high reduction ratio is increased in a part where the correlation is low and a chromatic blur is conspicuous. Specifically, the first mixing processing portion 24-1 increases the ratio of the enlarged image after the noise processing of the reduced image reduced at a high reduction ratio (⅙ reduced image), and decreases the ratio of the enlarged image after the noise processing of the reduced image reduced at a low reduction ratio (1/18 reduced image). When the mixing ratio is thus set, the ratio of the enlarged image that tends to cause a chromatic blur is reduced in a part where a chromatic blur tends to be conspicuous. Therefore an image of excellent image quality with a reduced chromatic blur can be obtained. In addition, the ratio of the enlarged image after the noise processing of the reduced image reduced at the low reduction ratio is increased in a part where a chromatic blur tends to be inconspicuous. It is thereby possible to remove noise in a large region, and obtain a strong noise removing effect. In addition, when a filter configuration is set according to the reduction ratios, efficient filter processing can be performed without wasting a time necessary for noise removal.

3. Second Embodiment

A region in which a chromatic blur occurs generally exists in only a part of an input image. In addition, degradation in resolution occurs when an averaging filter removes noise. Thus, a color region in which a chromatic blur tends to occur may be determined, and the mixing ratio of the input image not subjected to filter processing may be increased in only the part of the determined color region, thereby weakening the strength of the processing and thus reducing the chromatic blur. In the second embodiment, description will be made of a case of controlling the mixing ratio on the basis of a result of determination of a color region.

3-1. Configuration of Second Embodiment

Figure 8:
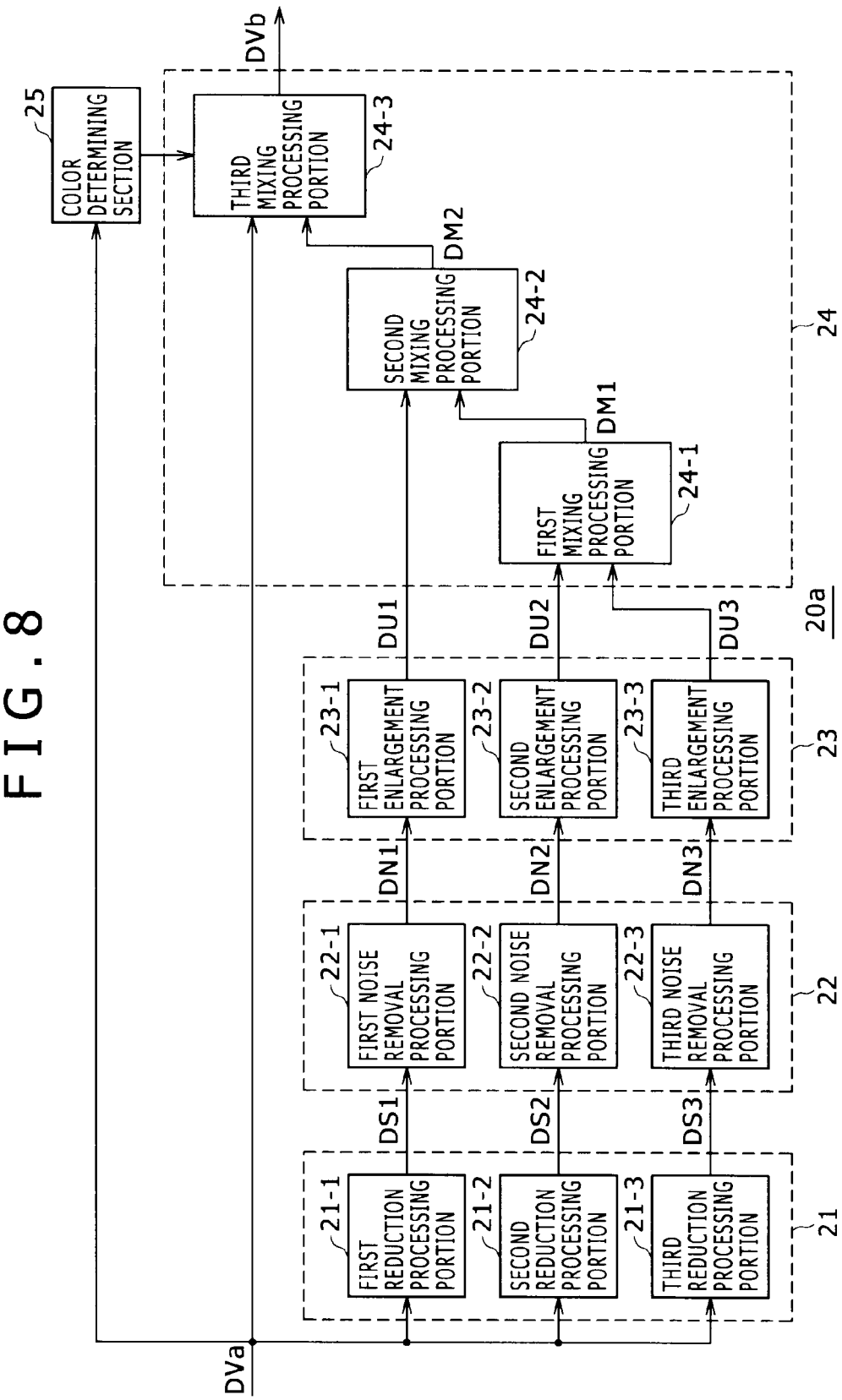
FIG. 8 is a diagram showing a configuration of a second embodiment.

FIG. 8 shows a configuration of a second embodiment of the noise removing unit. As in the first embodiment, a noise removing unit 20a includes a reducing section 21, a noise removal processing section 22, an enlarging section 23, and a mixing section 24. The second embodiment further includes a color determining section 25.

The reducing section 21 reduces an input image. For example, a first reduction processing portion 21-1 reduces the input image to a first size, and outputs the image signal of the first reduced image to the noise removal processing section 22. A second reduction processing portion 21-2 reduces the input image to a second size, and outputs the image signal of the second reduced image to the noise removal processing section 22. A third reduction processing portion 21-3 reduces the input image to a third size, and outputs the image signal of the third reduced image to the noise removal processing section 22.

The noise removal processing section 22 performs noise removal processing on the image signals supplied from the reducing section 21. For example, a first noise removal processing portion 22-1 performs filter processing on the image signal output from the first reduction processing portion 21-1 in the reducing section 21, thereby removing the noise of the image signal. The first noise removal processing portion 22-1 outputs the image signal to the enlarging section 23. A second noise removal processing portion 22-2 performs filter processing on the image signal output from the second reduction processing portion 21-2 in the reducing section 21, thereby removing the noise of the image signal. The second noise removal processing portion 22-2 outputs the image signal to the enlarging section 23. A third noise removal processing portion 22-3 performs filter processing on the image signal output from the third reduction processing portion 21-3 in the reducing section 21, thereby removing the noise of the image signal. The third noise removal processing portion 22-3 outputs the image signal to the enlarging section 23.

The enlarging section 23 performs image enlargement using the image signals supplied from the noise removal processing section 22. For example, a first enlargement processing portion 23-1 performs enlargement processing using the image signal output from the first noise removal processing portion 22-1 in the noise removal processing section 22, thereby generating the image signal of an enlarged image obtained by enlarging the image to a first size. The first enlargement processing portion 23-1 outputs the image signal of the enlarged image to the mixing section 24. A second enlargement processing portion 23-2 performs enlargement processing using the image signal output from the second noise removal processing portion 22-2 in the noise removal processing section 22, thereby generating the image signal of an enlarged image obtained by enlarging the image to a second size. The second enlargement processing portion 23-2 outputs the image signal of the enlarged image to the mixing section 24. A third enlargement processing portion 23-3 performs enlargement processing using the image signal output from the third noise removal processing portion 22-3 in the noise removal processing section 22, thereby generating the image signal of an enlarged image obtained by enlarging the image to a third size. The third enlargement processing portion 23-3 outputs the image signal of the enlarged image to the mixing section 24.

The mixing section 24 performs mixing processing on the images output from the enlarging section 23. For example, a first mixing processing portion 24-1 performs mixing processing using the image signal output from the second enlargement processing portion 23-2 in the enlarging section 23 and the image signal output from the third enlargement processing portion 23-3, thereby generating the image signal of a first mixed image. A second mixing processing portion 24-2 performs mixing processing using the image signal of the first mixed image output from the first mixing processing portion 24-1 and the image signal output from the first enlargement processing portion 23-1 in the enlarging section 23, thereby generating the image signal of a second mixed image. A third mixing processing portion 24-3 performs mixing processing using the image signal of the second mixed image output from the second mixing processing portion 24-2 and the image signal of the input image, thereby generating the image signal of an output image. Further, the third mixing processing portion 24-3 increases the ratio of an image having a high reduction ratio, that is, the input image (reduction ratio of 100%) in a color region in which a chromatic blur tends to occur on the basis of a result of color determination, and thereby reducing the chromatic blur.

The color determining section 25 determines the color of each pixel from luminance signals and color-difference signals, and outputs a result of the color determination to the mixing section 24. Various methods can be used for color determination processing by the color determining section 25. For example, the color determining section 25 determines the color of each pixel from the signal levels of the luminance signals and the color-difference signals.

3-2. Operation of Second Embodiment

Figure 9:
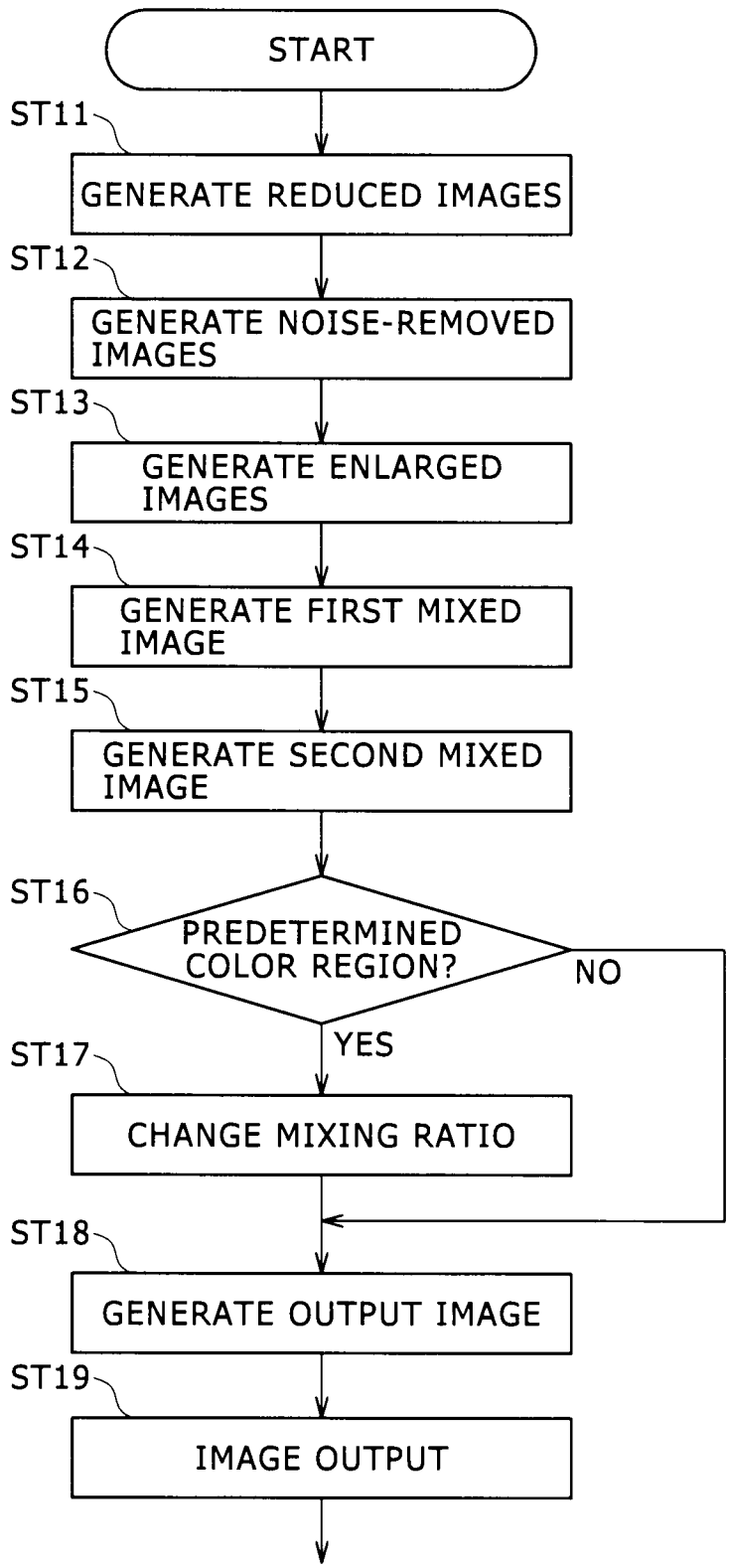
FIG. 9 is a diagram showing the operation of the second embodiment.

FIG. 9 is a flowchart illustrating the operation of the second embodiment, that is, the operation of the noise removing unit 20a. In step ST11, the noise removing unit 20a generates reduced images. The reducing section 21 in the noise removing unit 20a generates the image signals of the reduced images using an image signal supplied from the signal converting section 14. The process then proceeds to step ST12.

In step ST12, the noise removing unit 20a generates noise-removed images. The noise removal processing section 22 in the noise removing unit 20a performs noise removal processing using the image signals of the reduced images, thereby generating the image signals of the noise-removed images. The process then proceeds to step ST13.

In step ST13, the noise removing unit 20a generates enlarged images. The enlarging section 23 in the noise removing unit 20a performs image enlargement processing using the image signals of the noise-removed images, thereby generating the image signals of the enlarged images. The process then proceeds to step ST14.

In step ST14, the noise removing unit 20a generates a first mixed image. The mixing section 24 in the noise removing unit 20a performs mixing processing in the first mixing processing portion 24-1, thereby generating the image signal of the first mixed image. The process then proceeds to step ST15.

In step ST15, the noise removing unit 20a generates a second mixed image. The mixing section 24 in the noise removing unit 20a performs mixing processing in the second mixing processing portion 24-2, thereby generating the image signal of the second mixed image. The process then proceeds to step ST16.

In step ST16, the noise removing unit 20a determines whether a pixel of interest is in a predetermined color region. The color determining section 25 in the noise removing unit 20a determines the color of each pixel, and outputs a result of the determination to the mixing section 24. On the basis of the result of the color determination, the mixing section 24 proceeds to step ST17 when the pixel is in the predetermined color region, and proceeds to step ST18 when the pixel is not in the predetermined color region.

In step ST17, the noise removing unit 20a changes a mixing ratio. The mixing section 24 in the noise removing unit 20a increases the ratio of the input image by changing the mixing ratio when the third mixing processing portion 24-3 mixes the second enlarged image and the input image with each other. The process then proceeds to step ST18.

In step ST18, the noise removing unit 20a generates an output image. The mixing section 24 in the noise removing unit 20a performs mixing processing in the third mixing processing portion 24-3, that is, performs mixing processing using the image signal of the second mixed image and the image signal of the input image, thereby generating the image signal of the output image. The process then proceeds to step ST19.

In step ST19, the noise removing unit 20a performs image output. The noise removing unit 20a outputs the image signal of the output image generated in the mixing section 24.

When the ratio of the input image is thus increased in the predetermined color region, the chromatic blur can be reduced. In addition, when smoothing processing is performed using only pixels whose differences in luminance value are within a predetermined threshold value as in Patent Document 1, a color region of small luminance differences is not excluded from the smoothing processing, so that sharpness is lost in the color region of the small luminance differences. However, the present technology can prevent the loss of sharpness by making color determination, increasing the ratio of an image having a high reduction ratio in a predetermined color region, and thereby weakening the strength of noise removal processing. Incidentally, while the image signal generated by performing mixing processing in the third mixing processing portion 24-3 is set as the image signal of the output image in FIG. 8 and FIG. 9, the image signal generated by performing mixing processing in the second mixing processing portion 24-2, for example, can also be set as the image signal of the output image. In this case, the second mixing processing portion 24-2 can reduce a chromatic blur by increasing the ratio of an image having a high reduction ratio, that is, the image signal output from the first enlargement processing portion 23-1 in a color region in which a chromatic blur tends to occur on the basis of a result of color determination.

4. Third Embodiment

As described above, a region in which a chromatic blur occurs generally exists in only a part of an input image. Therefore, by determining a color region in which a chromatic blur tends to occur and changing filter processing in only the part of the region, it is possible to improve edge extraction performance and noise removing performance and thus improve image quality, and by reducing an operation scale in a region in which a chromatic blur does not occur easily, it is possible to achieve higher speed. In the third embodiment, description will be made of a case of controlling filter processing operation on the basis of a result of determination of a color region.

4-1. Configuration of Third Embodiment

Figure 10:
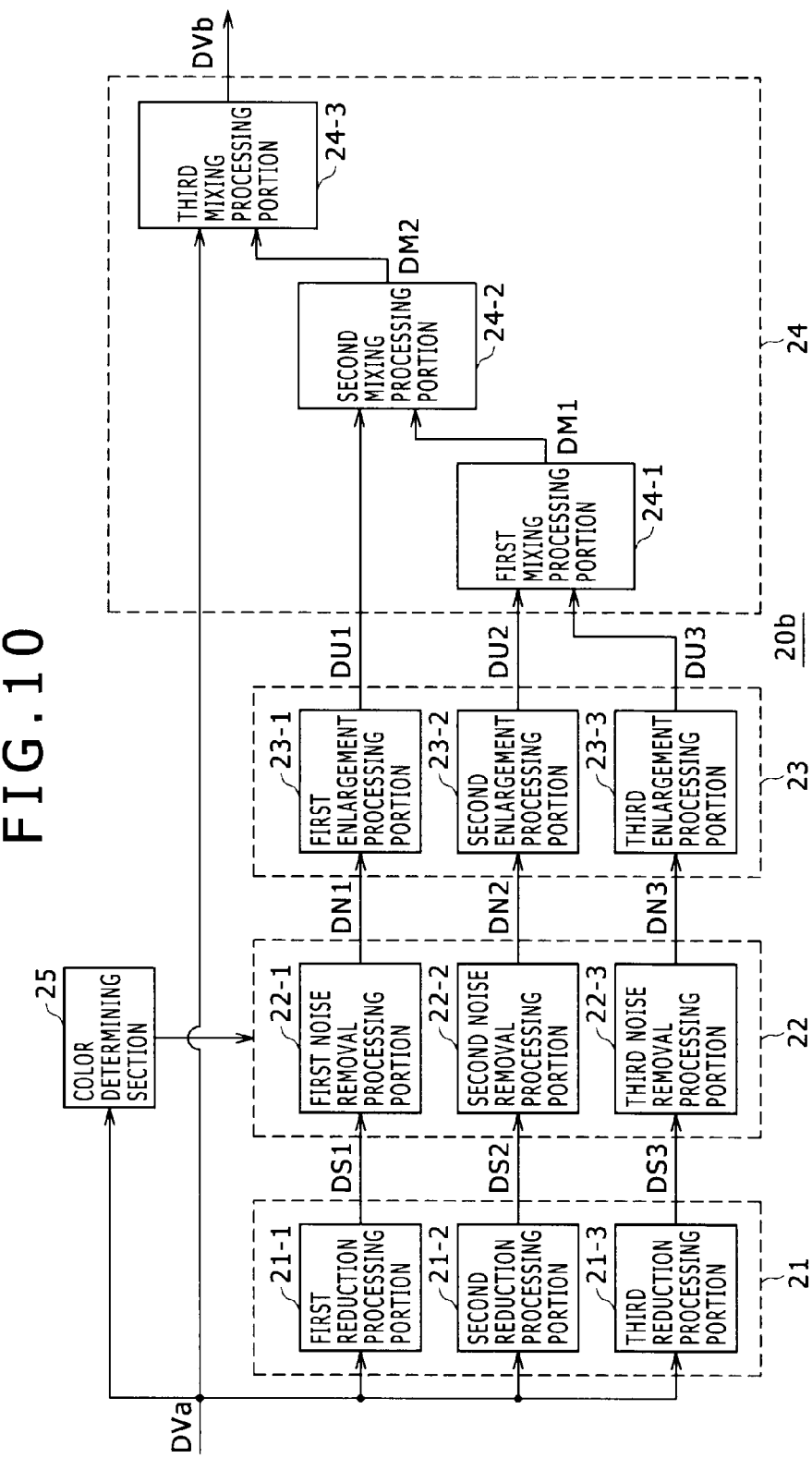
FIG. 10 is a diagram showing a configuration of a third embodiment.

FIG. 10 shows a configuration of a third embodiment of the noise removing unit. As in the second embodiment, a noise removing unit 20b includes a reducing section 21, a noise removal processing section 22, an enlarging section 23, a mixing section 24, and a color determining section 25.

The reducing section 21 reduces an input image. For example, a first reduction processing section 21-1 reduces the input image to a first size, and outputs the image signal of the first reduced image to the noise removal processing section 22. A second reduction processing portion 21-2 reduces the input image to a second size, and outputs the image signal of the second reduced image to the noise removal processing section 22. A third reduction processing portion 21-3 reduces the input image to a third size, and outputs the image signal of the third reduced image to the noise removal processing section 22.

The noise removal processing section 22 performs noise removal processing on the image signals supplied from the reducing section 21. For example, a first noise removal processing portion 22-1 performs filter processing on the image signal output from the first reduction processing portion 21-1 in the reducing section 21, thereby removing the noise of the image signal. The first noise removal processing portion 22-1 outputs the image signal to the enlarging section 23. A second noise removal processing portion 22-2 performs filter processing on the image signal output from the second reduction processing portion 21-2 in the reducing section 21, thereby removing the noise of the image signal. The second noise removal processing portion 22-2 outputs the image signal to the enlarging section 23. A third noise removal processing portion 22-3 performs filter processing on the image signal output from the third reduction processing portion 21-3 in the reducing section 21, thereby removing the noise of the image signal. The third noise removal processing portion 22-3 outputs the image signal to the enlarging section 23.

In addition, as shown in FIG. 7, the noise removal processing section 22 can rearrange noise removal processing. The noise removal processing section 22 selects filters used for the noise removal processing on the basis of a result of color determination from the color determining section 25. For example, the noise removal processing section 22 performs noise removal processing with priority given to processing speed or noise removal processing with priority given to noise removal performance.

The enlarging section 23 performs image enlargement using the image signals supplied from the noise removal processing section 22. For example, a first enlargement processing portion 23-1 performs enlargement processing using the image signal output from the first noise removal processing portion 22-1 in the noise removal processing section 22, thereby generating the image signal of an enlarged image obtained by enlarging the image to a first size. The first enlargement processing portion 23-1 outputs the image signal of the enlarged image to the mixing section 24. A second enlargement processing portion 23-2 performs enlargement processing using the image signal output from the second noise removal processing portion 22-2 in the noise removal processing section 22, thereby generating the image signal of an enlarged image obtained by enlarging the image to a second size. The second enlargement processing portion 23-2 outputs the image signal of the enlarged image to the mixing section 24. A third enlargement processing portion 23-3 performs enlargement processing using the image signal output from the third noise removal processing portion 22-3 in the noise removal processing section 22, thereby generating the image signal of an enlarged image obtained by enlarging the image to a third size. The third enlargement processing portion 23-3 outputs the image signal of the enlarged image to the mixing section 24.

The mixing section 24 performs mixing processing on the images output from the enlarging section 23. For example, a first mixing processing portion 24-1 performs mixing processing using the image signal output from the second enlargement processing portion 23-2 in the enlarging section 23 and the image signal output from the third enlargement processing portion 23-3, thereby generating the image signal of a first mixed image. A second mixing processing portion 24-2 performs mixing processing using the image signal of the first mixed image output from the first mixing processing portion 24-1 and the image signal output from the first enlargement processing portion 23-1 in the enlarging section 23, thereby generating the image signal of a second mixed image. A third mixing processing portion 24-3 performs mixing processing using the image signal of the second mixed image output from the second mixing processing portion 24-2 and the image signal of the input image, thereby generating the image signal of an output image.

The color determining section 25 determines the color of each pixel from luminance signals and color-difference signals, and outputs a result of the color determination to the noise removal processing section 22. Various methods can be used for color determination processing by the color determining section 25. For example, the color determining section 25 determines the color of each pixel from the signal levels of the luminance signals and the color-difference signals. Incidentally, the color determining section 25 may supply the color determination result to the control section 30 so that the control section 30 changes the noise removal processing performed in the noise removal processing section 22 of the noise removing unit 20*b*.

4-2. Operation of Third Embodiment

Figure 11:
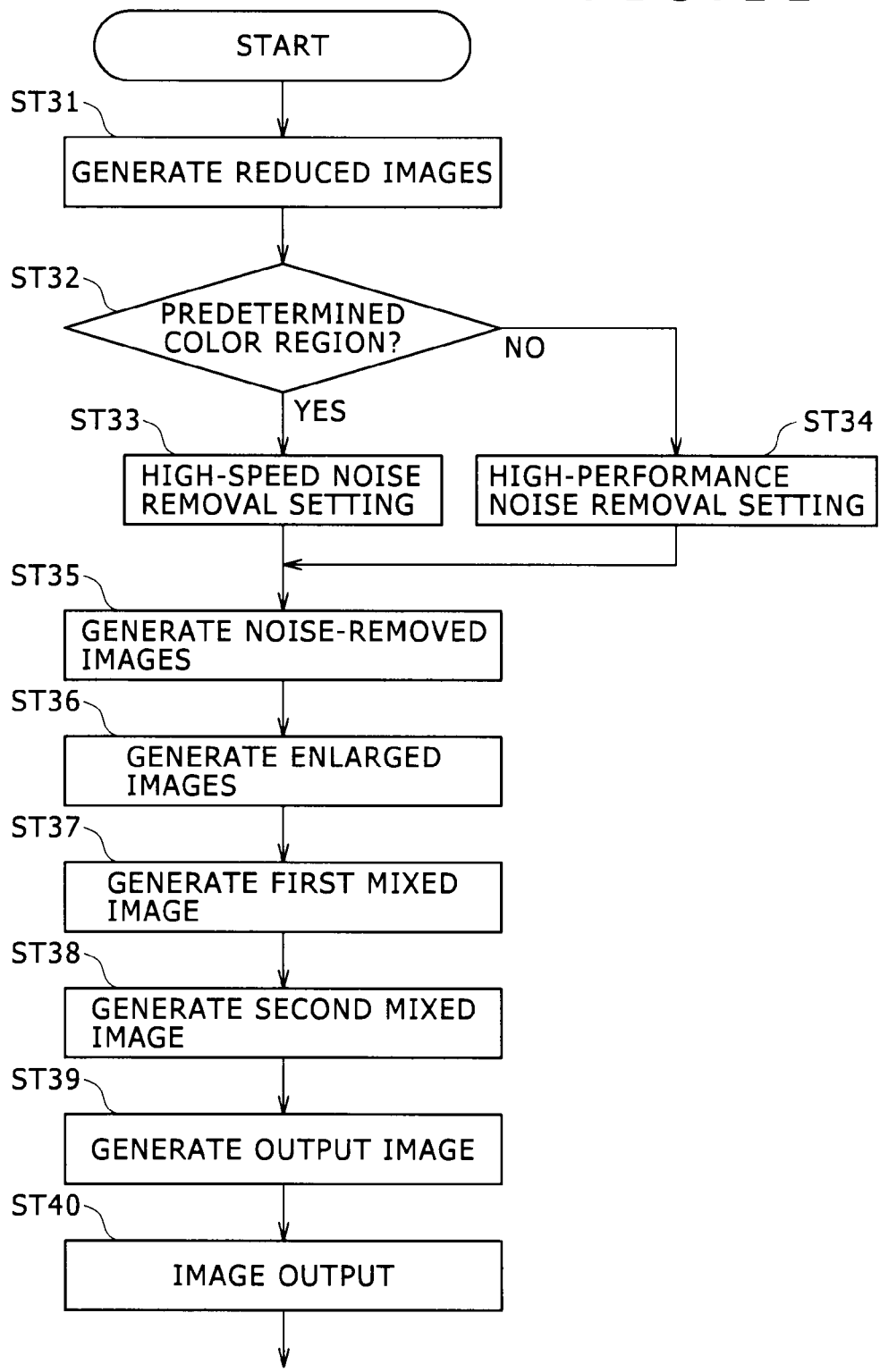
FIG. 11 is a diagram showing the operation of the third embodiment.

FIG. 11 is a flowchart illustrating the operation of the third embodiment, that is, the operation of the noise removing unit 20*b*. In step ST31, the noise removing unit 20*b* generates reduced images. The reducing section 21 in the noise removing unit 20*b* generates the image signals of the reduced images using an image signal supplied from the signal converting section 14. The process then proceeds to step ST32.

In step ST32, the noise removing unit 20*b* determines whether a pixel of interest is in a predetermined color region. The color determining section 25 in the noise removing unit 20*b* determines the color of each pixel, and outputs a result of the determination to the noise removal processing section 22. On the basis of the result of the color determination, the noise removal processing section 22 proceeds to step ST33 when the pixel is in the predetermined color region, and proceeds to step ST34 when the pixel is not in the predetermined color region.

In step ST33, the noise removing unit 20*b* makes a high-speed noise removal setting. The noise removal processing section 22 in the noise removing unit 20*b* selects filters used for noise removal processing so that the noise removal processing section 22 performs noise removal processing with priority given to processing speed. The process then proceeds to step ST35. For example, the noise removal processing section 22 performs noise removal processing using only simple low-pass filters (LPFs).

In step S34, the noise removing unit 20*b* makes a high-performance noise removal setting. The noise removal processing section 22 in the noise removing unit 20*b* selects filters used for noise removal processing so that the noise removal processing section 22 performs noise removal processing with priority given to noise removal performance. The process then proceeds to step ST35. For example, the noise removal processing section 22 performs noise removal processing using bilateral filters (BL) or a combination of bilateral filters and other filters.

In step S35, the noise removing unit 20*b* generates noise-removed images. The noise removal processing section 22 in the noise removing unit 20*b* performs noise removal processing on the image signals of the reduced images using the filters set in step ST33 or step ST34, thereby generating the image signals of the noise-removed images. The process then proceeds to step ST36.

In step ST36, the noise removing unit 20*b* generates enlarged images. The enlarging section 23 in the noise removing unit 20*b* performs image enlargement processing using the image signals of the noise-removed images, thereby generating the image signals of the enlarged images. The process then proceeds to step ST37.

In step ST37, the noise removing unit 20b generates a first mixed image. The mixing section 24 in the noise removing unit 20b performs mixing processing in the first mixing processing portion 24-1, thereby generating the image signal of the first mixed image. The process then proceeds to step ST38.

In step ST38, the noise removing unit 20b generates a second mixed image. The mixing section 24 in the noise removing unit 20b performs mixing processing in the second mixing processing portion 24-2, thereby generating the image signal of the second mixed image. The process then proceeds to step ST39.

In step ST39, the noise removing unit 20b generates an output image. The mixing section 24 in the noise removing unit 20b performs mixing processing in the third mixing processing portion 24-3, that is, performs mixing processing using the image signal of the second mixed image and the image signal of the input image, thereby generating the image signal of the output image. The process then proceeds to step ST40.

In step ST40, the noise removing unit 20b performs image output. The noise removing unit 20b outputs the image signal of the output image generated in the mixing section 24.

Thus, the noise removal processing section is formed by a plurality of kinds of filters, and has a rearrangeable filter configuration. On a basis of a result of determination of the color of the input image, a first filter configuration with high noise removal performance is used for a particular color, and a second filter configuration with high processing speed is used for other than the particular color. With such filter configurations, an image of excellent image quality without a loss of sharpness in edge parts can be obtained efficiently.

The series of processes described in the specification can be performed by hardware, software, or a composite configuration of both hardware and software. When processing is performed by software, a program in which a processing sequence is recorded is executed after being installed into a memory within a computer incorporated in dedicated hardware. Alternatively, the program can be executed after being installed on a general-purpose computer capable of performing various kinds of processing.

For example, the program can be recorded on a hard disk or a ROM (Read Only Memory) as a recording medium in advance. Alternatively, the program can be stored (recorded) temporarily or permanently on a removable recording medium such as a flexible disk, a CD-ROM (Compact Disc Read Only Memory), an MO (Magneto-Optical) disk, a DVD (Digital Versatile Disc), a magnetic disk, a semiconductor memory, or the like. Such a removable recording medium can be provided as so-called packaged software.

In addition to being installed from a removable recording medium as described above onto a computer, the program is transferred by radio from a download site to a computer or transferred by wire to a computer via networks such as a LAN (Local Area Network), the Internet, and the like. The computer can receive the program transferred in such a manner, and install the program onto a recording medium such as a built-in hard disk or the like.

Further, the reduction ratios and the enlargement ratios are not limited to the above-described illustrations. In addition, while description has been made of a case where the reducing section generates reduced images in three stages, the reducing section may generate reduction ratios in two stages or four stages or more. In addition, the processing of the noise removal processing section 22 may be performed by another configuration, and a path in which no processing is performed according to an externally specified value may be provided.

Effects of the present technology are not limited to color noise, but the present technical idea is also applicable to noise included in luminance signals. There is only a difference between color-difference signals and luminance signals in that characteristics of frequency and amplitude of noise differ between color-difference signals and luminance signals and thus an optimum filter range and a threshold value differ between color-difference signals and luminance signals. In addition, the image processing device is not only applicable to imaging devices but also applicable to devices for performing image recording and reproduction, editing, output, and the like, for example image editing devices, image recording and reproducing devices, printers, and the like.

The present technology is not to be construed as being limited to the foregoing embodiments. The embodiments of the present technology disclose the present technology in an illustrative form. It is obvious that modifications and substitutions in the embodiments can be made by those skilled in the art without departing from the spirit of the present technology. That is, in order to determine the spirit of the present technology, claims are to be considered.

According to an image processing device and an image processing method according to an embodiment of the present technology, an input image is reduced at a plurality of reduction ratios, and noise-removed images are generated by performing noise removal processing on each of a plurality of reduced images. In addition, enlarged images equal to each other in size are generated by enlarging each of the noise-removed images, and an output image is generated by mixing two or more different enlarged images with each other. Because noise removal is thus applied to the images reduced at the plurality of reduction ratios, chromatic blurs in edge parts of the respective enlarged images are different from each other. Mixing two or more different enlarged images with each other can provide an image of excellent image quality without a loss of sharpness in edge parts. The present technology is therefore suitable for devices for performing image recording and reproduction, editing, output, and the like, for example imaging devices, image editing devices, image recording and reproducing devices, printers, and the like.

The present technology contains subject matter related to that disclosed in Japanese Priority Patent Application JP 2011-081543 filed in the Japan Patent Office on Apr. 1, 2011, the entire content of which is hereby incorporated by reference.

What is claimed is:

1. An image processing device comprising:
   a reducing section configured to generate a plurality of reduced images by reducing an input image at a plurality of reduction ratios;
   a noise removal processing section configured to generate noise-removed images by performing noise removal processing on each of said reduced images;
   an enlarging section configured to generate enlarged images equal to each other in size by enlarging each of said noise-removed images; and
   a mixing section configured to generate an output image by mixing two or more different enlarged images of said enlarged images with each other,
   wherein said mixing section calculates a mixing ratio between the enlarged images to be mixed with each other on a basis of correlation between the enlarged images to be mixed with each other,
   wherein said mixing section increases a ratio of an image having a high reduction ratio as said correlation is decreased.

2. The image processing device according to claim 1, further comprising a color determining section configured to determine a color of said input image, wherein said mixing section generates said output image by mixing said input image and an enlarged image after said mixing with each other, and increases or decreases a mixing ratio between said images to be mixed with each other for a particular color on a basis of a result of color determination.

3. The image processing device according to claim 2, wherein said mixing section increases a ratio of an image having a high said reduction ratio when said input image is of said particular color.

4. The image processing device according to claim 1, wherein said noise removal processing section is formed by using a plurality of kinds of filters, and has a rearrangeable filter configuration for performing the noise removal processing on said reduced images.

5. The image processing device according to claim 4, further comprising
a color determining section configured to determine a color of said input image,
wherein said noise removal processing section changes said filter configuration according to a result of color determination.

6. The image processing device according to claim 5, wherein said noise removal processing section uses a first filter configuration for a particular color and uses a second filter configuration for other than said particular color on a basis of the result of the color determination, said first filter configuration being a filter configuration with higher noise removal performance than said second filter configuration, and said second filter configuration being a filter configuration with higher processing speed than said first filter configuration.

7. An image processing method comprising:
generating a plurality of reduced images by reducing an input image at a plurality of reduction ratios;
generating noise-removed images by performing noise removal processing on each of said reduced images;
generating enlarged images equal to each other in size by enlarging each of said noise-removed images; and
generating an output image by mixing two or more different enlarged images of said enlarged images with each other;
determining a color of said input image;
wherein said output image is generated by mixing said input image and an enlarged image after said mixing with each other, and increases or decreases a mixing ratio between said images to be mixed with each other for a particular color based on result of color determination.

8. An image processing device comprising:
a reducing section configured to generate a plurality of reduced images by reducing an input image at a plurality of reduction ratios;
a noise removal processing section configured to generate noise-removed images by performing noise removal processing on each of said reduced images;
an enlarging section configured to generate enlarged images equal to each other in size by enlarging each of said noise-removed images;
a mixing section configured to generate an output image by mixing two or more different enlarged images of said enlarged images with each other; and
a color determining section configured to determine a color of said input image,
wherein said noise removal processing section uses a first filter configuration for a particular color and uses a second filter configuration for other than said particular color based on the result of the color determination, said first filter configuration being a filter configuration with higher noise removal performance than said second filter configuration, and said second filter configuration being a filter configuration with higher processing speed than said first filter configuration.

9. The image processing device according to claim 8, wherein said mixing section calculates said mixing ratio using color-difference signals of said enlarged images to be mixed with each other.

10. The image processing device according to claim 8, wherein said noise removal processing section is formed by using a plurality of kinds of filters, and has a rearrangeable filter configuration for performing the noise removal processing on said reduced images.

11. The image processing device according to claim 10, further comprising
wherein said noise removal processing section changes said filter configuration according to a result of color determination.

* * * * *